US012761725B2

(12) United States Patent
He et al.

(10) Patent No.: US 12,761,725 B2
(45) Date of Patent: Oct. 13, 2026

(54) VIEWING ANGLE PREDICTION METHOD, DEVICE, AND STORAGE MEDIUM

(71) Applicants: Douyin Vision Co., Ltd., Beijing (CN); Lemon Inc., Grand Cayman (KY)

(72) Inventors: Wei He, Beijing (CN); Liyang Sun, Los Angeles, CA (US); Aoyang Zhang, Beijing (CN); Qian Ma, Beijing (CN)

(73) Assignees: DOUYIN VISION CO., LTD., Beijing (CN); LEMON INC., Grand Cayman (KY)

( * ) Notice: Subject to any disclaimer, the term of this patent is extended or adjusted under 35 U.S.C. 154(b) by 0 days.

(21) Appl. No.: 18/877,965

(22) PCT Filed: Nov. 7, 2023

(86) PCT No.: PCT/CN2023/130239

§ 371 (c)(1),
(2) Date: Dec. 20, 2024

(87) PCT Pub. No.: WO2024/099314

PCT Pub. Date: May 16, 2024

(65) Prior Publication Data

US 2025/0370534 A1 Dec. 4, 2025

(30) Foreign Application Priority Data

Nov. 8, 2022 (CN) ......................... 202211394450.4

(51) Int. Cl.
*G06F 3/01* (2006.01)
*G06V 10/74* (2022.01)

(52) U.S. Cl.
CPC ............ *G06F 3/012* (2013.01); *G06V 10/761* (2022.01)

(58) Field of Classification Search
CPC .............................. G06F 3/012; G06V 10/761
See application file for complete search history.

(56) References Cited

U.S. PATENT DOCUMENTS

2018/0096494 A1 4/2018 Zhou
2019/0104324 A1 * 4/2019 Han ..................... H04N 21/234
2020/0169711 A1 * 5/2020 Wu ..................... H04N 13/117

FOREIGN PATENT DOCUMENTS

CN 112507799 A 3/2021
CN 112995596 A 6/2021

(Continued)

OTHER PUBLICATIONS

X. Chen, A. T. Z. Kasgari and W. Saad, "Deep Learning for Content-Based Personalized Viewport Prediction of 360-Degree VR Videos," in IEEE Networking Letters, vol. 2, No. 2, pp. 81-84, Jun. 2020. (Year: 2020).*

(Continued)

*Primary Examiner* — Stephen G Sherman
(74) *Attorney, Agent, or Firm* — Astute IP Law Group

(57) ABSTRACT

A viewing angle prediction method, including determining a current predicted viewing angle corresponding to a current to-be-downloaded clip in a panoramic video based on a head movement trajectory of a user viewing the panoramic video (S110); acquiring a target candidate viewing angle set corresponding to said current to-be-downloaded clip in response to detecting that a current head turning action in the head movement trajectory is an invalid action (S120); and performing correction processing on the current predicted viewing angle, and determining a target predicted viewing angle corresponding to said current to-be-downloaded clip, based on the target candidate viewing angle set (S130).

17 Claims, 4 Drawing Sheets

(56) References Cited

FOREIGN PATENT DOCUMENTS

| | | | | | |
|---|---|---|---|---|---|
| CN | 114827750 | A | | 7/2022 | |
| CN | 114979652 | A | | 8/2022 | |
| CN | 115022546 | A | | 9/2022 | |
| CN | 115103023 | A | * | 9/2022 | ....... H04N 21/44004 |
| CN | 115756158 | A | | 3/2023 | |
| JP | 2001086451 | A | | 3/2001 | |
| WO | 2022199441 | A1 | | 9/2022 | |

OTHER PUBLICATIONS

International Search Report and Written Opinion for PCT/CN2023/130239, mailed on Dec. 21, 2023, 16 pages.

Office Action for Chinese Patent Application No. 202211394450.4, mailed on Dec. 19, 2025, 12 pages.

* cited by examiner

VIEWING ANGLE PREDICTION METHOD, DEVICE, AND STORAGE MEDIUM

The present application is a national phase application of International Patent Application No. PCT/CN2023/130239, filed on Nov. 7, 2023, which claims priority to and benefits of Chinese Patent Application No. 202211394450.4, which was filed on Nov. 8, 2022. All the aforementioned patent applications are hereby incorporated by reference in their entireties.

TECHNICAL FIELD

Embodiments of the disclosure relate to a viewing angle prediction method and apparatus, a device, and a storage medium.

BACKGROUND

With the rapid development of computer technologies, virtual reality (VR) technology has been widely used. For example, a user can wear a VR headset to view a panoramic video, and can switch their viewing angle for the panoramic video through a head turning action.

Currently, the VR headset usually predicts a future viewing angle of the user, so as to request to download only video streams at the viewing angle, thereby reducing the transmission bandwidth. Viewing angle prediction is generally performed based on a full viewing angle. Therefore, an overlarge head turning amplitude of the user due to non-video factors may cause a large deviation in a predicted viewing angle, which reduces the accuracy of viewing angle prediction.

SUMMARY

The disclosure provides a viewing angle prediction method and apparatus, a device, and a storage medium, so as to solve a viewing angle prediction deviation caused by an overlarge head turning amplitude of a user due to non-video factors, thereby improving the accuracy of viewing angle prediction.

According to a first aspect, an embodiment of the disclosure provides a viewing angle prediction method. The method includes:

- determining a current predicted viewing angle corresponding to a current to-be-downloaded clip in a panoramic video based on a head movement trajectory of a user viewing the panoramic video;
- acquiring a target candidate viewing angle set corresponding to the current to-be-downloaded clip in response to detecting that a current head turning action in the head movement trajectory is an invalid action; and
- performing correction processing on the current predicted viewing angle and determining a target predicted viewing angle corresponding to the current to-be-downloaded clip, based on the target candidate viewing angle set.

According to a second aspect, an embodiment of the disclosure further provides a viewing angle prediction apparatus. The apparatus includes:

- a current predicted viewing angle determining module configured to determine a current predicted viewing angle corresponding to a current to-be-downloaded clip in the panoramic video based on a head movement trajectory of a user viewing the panoramic video;
- a target candidate viewing angle set acquiring module configured to acquire a target candidate viewing angle set corresponding to the current to-be-downloaded clip in response to detecting that a current head turning action in the head movement trajectory is an invalid action; and
- a viewing angle correction processing module configured to perform correction processing on the current predicted viewing angle and determine a target predicted viewing angle corresponding to the current to-be-downloaded clip, based on the target candidate viewing angle set.

According to a third aspect, an embodiment of the disclosure further provides an electronic device. The electronic device includes:

- one or more processors; and
- a storage apparatus configured to store one or more programs,
- the one or more programs, when executed by the one or more processors, cause the one or more processors to implement the viewing angle prediction method described in any one of the embodiments of the disclosure.

According to a fourth aspect, an embodiment of the disclosure further provides a storage medium containing computer-executable instructions, the computer-executable instructions, when executed by a computer processor, are used to perform the viewing angle prediction method described in any one of the embodiments of the disclosure.

BRIEF DESCRIPTION OF DRAWINGS

The foregoing and other features, advantages, and aspects of embodiments of the disclosure become more apparent with reference to the following specific implementations and in conjunction with the accompanying drawings. Throughout the accompanying drawings, the same or similar reference numerals denote the same or similar elements. It should be understood that the accompanying drawings are schematic and that parts and elements are not necessarily drawn to scale.

DETAILED DESCRIPTION

The embodiments of the disclosure are described in more detail below with reference to the accompanying drawings. Although some embodiments of the disclosure are shown in the accompanying drawings, it should be understood that the disclosure may be implemented in various forms and should not be construed as being limited to the embodiments set forth herein. Rather, these embodiments are provided for a more thorough and complete understanding of the disclosure. It should be understood that the accompanying drawings and the embodiments of the disclosure are only for exemplary purposes, and are not intended to limit the scope of protection of the disclosure.

It should be understood that the various steps described in the method implementations of the disclosure may be performed in different orders, and/or performed in parallel. Furthermore, additional steps may be included and/or the execution of the illustrated steps may be omitted in the method implementations. The scope of the disclosure is not limited in this respect.

The term "include" used herein and the variations thereof are an open-ended inclusion, namely, "include but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the disclosure are only used to distinguish different apparatuses, modules, or units, and are not used to limit the sequence of functions performed by these apparatuses, modules, or units or interdependence.

It should be noted that the modifiers "one" and "a plurality of" mentioned in the disclosure are illustrative and not restrictive, and those skilled in the art should understand that unless the context clearly indicates otherwise, the modifiers should be understood as "one or more".

The names of messages or information exchanged between a plurality of apparatuses in the implementations of the disclosure are used for illustrative purposes only, and are not used to limit the scope of these messages or information.

Figure 1:
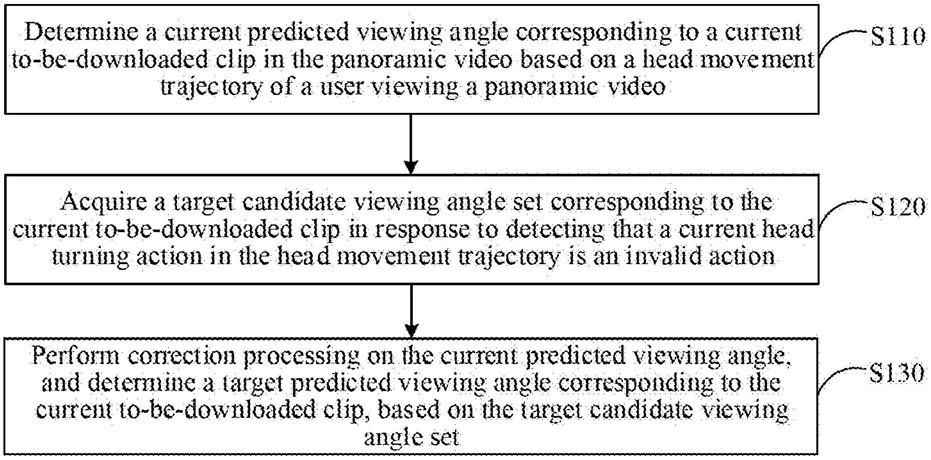
FIG. 1 is a schematic flowchart of a viewing angle prediction method according to an embodiment of the disclosure.

FIG. 1 is a schematic flowchart of a viewing angle prediction method according to an embodiment of the disclosure. This embodiment of the disclosure is applicable to a case of predicting a viewing angle of a to-be-downloaded clip in a panoramic video, and especially may be used in a scenario of performing viewing angle prediction on a panoramic video played by a VR headset. The method may be performed by a viewing angle prediction apparatus, which may be implemented in the form of software and/or hardware, optionally by an electronic device. The electronic device may be a VR headset, such as a VR helmet, etc.

As shown in FIG. 1, the viewing angle prediction method specifically includes the following steps.

S110: Determine a current predicted viewing angle corresponding to a current to-be-downloaded clip in a panoramic video based on a head movement trajectory of a user viewing the panoramic video.

Figure 2:
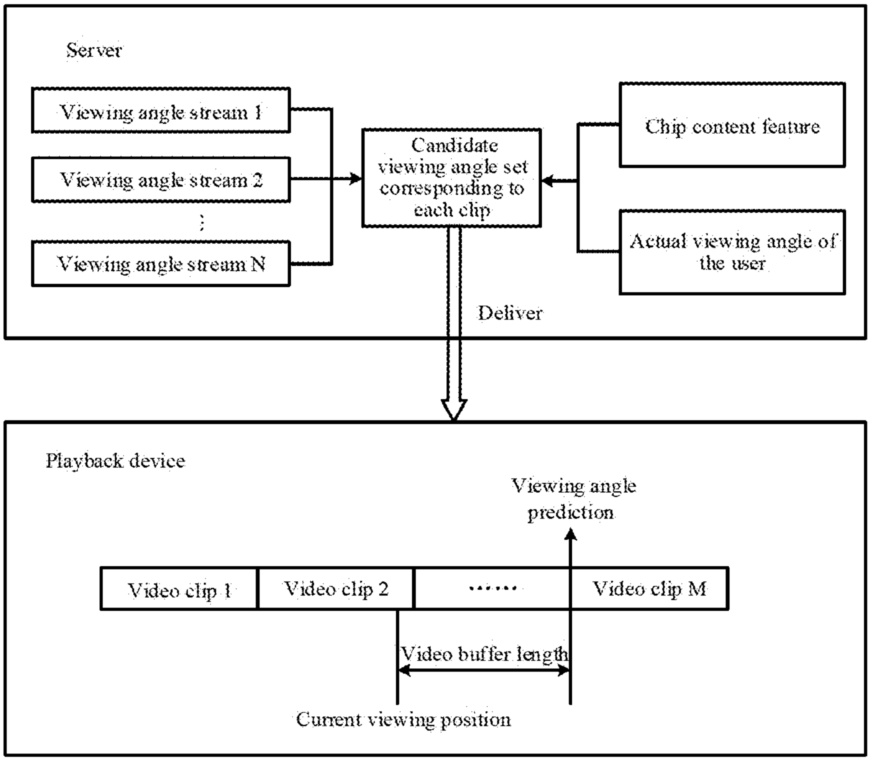
FIG. 2 is an example of a viewing angle prediction process according to an embodiment of the disclosure.

The panoramic video may be, but is not limited to, a VR panoramic video. The panoramic video may be downloaded and played in the form of video clips. That is, the panoramic video may include a plurality of video clips, all of which are downloaded and played one by one in sequence, to complete the downloading and playback of the panoramic video. The current to-be-downloaded clip may refer to a video clip in the panoramic video that currently needs to be downloaded. To reduce the risk of playback lag and ensure smooth viewing, a playback device of the panoramic video may buffer some video clips that have been downloaded but not yet played. That is, there is a certain length of buffered video between the video clip that is being currently played and the current to-be-downloaded clip. For example, FIG. 2 gives an example of a viewing angle prediction process. As shown in FIG. 2, the playback device is playing a video clip 2 in the panoramic video, the current to-be-downloaded clip is a video clip M, and a video length between a current viewing position in the video clip 2 and the video clip M is a video buffer length of the playback device.

The head movement trajectory may refer to a change trajectory of the head position of the user from the start of viewing the panoramic video to a current moment. For example, the head movement trajectory may consist of a plurality of head positions sampled between the moment when the panoramic video starts to be viewed and the current moment. The head movement trajectory may be dynamically updated as viewing time passes. For example, the head movement trajectory may be: [P0, P1, P2, . . . , Pt]. P0 is the head position at the moment when the panoramic video starts to be viewed. Pt is the head position at the current moment. It should be noted that the head position corresponds to a viewing angle, and the user may switch the viewing angle by turning the head. For example, each head position may correspond to one viewing angle, or head positions within a range may correspond to one viewing angle, and the correspondence may be set based on service requirements. The head movement trajectory may be used to represent a viewing angle change trajectory of the panoramic video.

Specifically, during the process of the user viewing the panoramic video, a viewing angle prediction manner may be used in which viewing angle prediction is performed based on the head movement trajectory of the user in a viewing angle prediction manner, to determine the current predicted viewing angle corresponding to the current to-be-downloaded clip. For example, viewing angle fluctuation information of the user during a historical viewing time may be determined based on the head movement trajectory of the user, and viewing angle prediction may be performed based on the viewing angle fluctuation information and the current viewing angle, to obtain the current predicted viewing angle corresponding to the current to-be-downloaded clip. For example, when a viewing angle fluctuation variance is less than or equal to a preset variance threshold, it indicates that the head turning action of the user is relatively smooth. In this case, viewing angle prediction may be performed in a conservative viewing angle prediction manner. When the viewing angle fluctuation variance is greater than the preset variance threshold, it indicates that the user prefers to change their viewing angle. In this case, viewing angle prediction may be performed in an aggressive viewing angle prediction manner, thereby preliminarily avoiding an over-large deviation of the predicted current predicted viewing angle from the current viewing angle, preliminarily ensuring the accuracy of a viewing angle prediction result, and further improving the subsequent viewing angle correction effect.

S120: Acquire a target candidate viewing angle set corresponding to the current to-be-downloaded clip in response to detecting that a current head turning action in the head movement trajectory is an invalid action.

The current head turning action may refer to a head turning action of the user at the current moment, that is, an action of the user turning from a previous head position to a current head position. The current head position may refer to a head position of the user at the current moment. The previous head position may refer to a head position of the user at a previous sampling moment. The invalid action may refer to an action of turning the head with a large amplitude due to non-video factors. Each clip in the panoramic video corresponds to one candidate viewing angle set. The target candidate set may be a candidate viewing angle set corresponding to the current to-be-downloaded clip. The target candidate viewing angle set may consist of one or more target candidate viewing angles. The target candidate viewing angle may be a viewing angle that the user may be interested in when viewing the current to-be-downloaded clip. The target candidate viewing angle may be determined based on a clip content feature corresponding to the current to-be-downloaded clip, and/or an actual viewing angle of the user.

Specifically, whether the current head turning action of the user is an invalid action may be detected based on the head movement trajectory. For example, whether the current head turning action is an accidental head turning action due to non-video factors may be determined by means of viewing angle tracking and image recognition. In response to detecting that the current head turning action is an invalid action, the playback device may determine the target candidate viewing angle set corresponding to the current to-be-downloaded clip in real time based on the clip content feature corresponding to the current to-be-downloaded clip, or may directly acquire the target candidate viewing angle set corresponding to the current to-be-downloaded clip that is delivered by a server, thereby further improving the efficiency and accuracy of viewing angle prediction.

It should be noted that when it is detected that the current head turning action is a valid action, it indicates that there is no large deviation in the current predicted viewing angle. In this case, the server may be directly requested to download the current to-be-downloaded clip at the current predicted viewing angle, thereby ensuring the accuracy of viewing angle prediction.

S130: Perform correction processing on the current predicted viewing angle, and determine a target predicted viewing angle corresponding to the current to-be-downloaded clip, based on the target candidate viewing angle set.

Specifically, a target candidate viewing angle in the target candidate viewing angle set that is closest to the current predicted viewing angle may be used as the target predicted viewing angle corresponding to the current to-be-downloaded clip, so that correction processing is performed on the current predicted viewing angle using the target candidate viewing angle set, thereby avoiding a large deviation in the predicted viewing angle caused by an overlarge head turning amplitude of the user due to non-video factors, and improving the accuracy of viewing angle prediction. After the target predicted viewing angle is determined, the server may be requested to download the current to-be-downloaded clip at the target predicted viewing angle, thereby ensuring the accuracy of the clip downloading, further reducing the transmission bandwidth.

For example, S130 may include: determining a viewing angle difference between each target candidate viewing angle in the target candidate viewing angle set and the current predicted viewing angle; and determining a target candidate viewing angle with a minimum viewing angle difference as the target predicted viewing angle corresponding to the current to-be-downloaded clip.

Specifically, each target candidate viewing angle in the target candidate viewing angle set may be subtracted from the current predicted viewing angle, and an absolute value of a subtraction result may be determined as the corresponding viewing angle difference. All viewing angle differences are compared, and a target candidate viewing angle with a minimum viewing angle difference is determined as the target predicted viewing angle, so that the viewing angle can be accurately corrected to ensure the accuracy of viewing angle prediction.

In the technical solutions of this embodiment of the disclosure, the current predicted viewing angle corresponding to the current to-be-downloaded clip in the panoramic video is determined based on the head movement trajectory of the user viewing the panoramic video, and whether the current head turning action in the head movement trajectory is an invalid action is detected. When the current head turning action is an invalid action, it indicates that the user is currently turning the head with a large amplitude due to non-video factors. In this case, correction processing may be performed on the current predicted viewing angle based on the target candidate viewing angle set corresponding to the current to-be-downloaded clip, so that a more accurate target predicted viewing angle corresponding to the current to-be-downloaded clip can be obtained, thereby avoiding a large deviation in the predicted viewing angle caused by an overlarge head turning amplitude of the user due to non-video factors, and improving the accuracy of viewing angle prediction.

On the basis of the above technical solutions, the "acquiring a target candidate viewing angle set corresponding to the current to-be-downloaded clip" in S120 may include: acquiring a panoramic video header file corresponding to the panoramic video, wherein the panoramic video header file includes a candidate viewing angle set corresponding to each clip of the panoramic video, the candidate viewing angle set is determined based on a clip content feature corresponding to each clip, and/or an actual viewing angle of the user; and obtaining the target candidate viewing angle set corresponding to the current to-be-downloaded clip based on the panoramic video header file.

Specifically, as shown in FIG. 2, the server may determine a candidate viewing angle set corresponding to each clip in advance based on the clip content feature corresponding to each clip, and/or the actual viewing angle of the user. For example, the direction of the viewing angle where an area that the user may be interested in may be determined only based on the clip content feature of each clip, thereby obtaining the candidate viewing angle set corresponding to each clip. Alternatively, actual viewing angles corresponding to each clip when all users view the panoramic video may be collected, and popularities may be ranked based on actual viewing angles of the users. Actual viewing angles with higher popularities are used as candidate viewing angles of the clip, that is, actual viewing angles that more users view are used as the candidate viewing angles of the clip, thereby obtaining the candidate viewing angle set corresponding to the clip. Alternatively, the candidate viewing angle set corresponding to each clip may be determined based on both the clip content feature and the actual viewing angle of the user, so as to further improve the accuracy of viewing angle prediction. After determining the candidate viewing angle set corresponding to each clip, the server may write all the candidate viewing angle sets into the panoramic video header file, and deliver the panoramic video header file, together with the panoramic video, to the playback device. The playback device may obtain the target candidate viewing angle set corresponding to the current to-be-downloaded clip more quickly based on the candidate viewing angle set corresponding to each clip in the panoramic video header file, thereby further improving the efficiency of viewing angle prediction.

For example, determining the candidate viewing angle set based on a clip content feature corresponding to each clip, and an actual viewing angle of the user may include: determining, for each clip, all viewing angles of interest corresponding to the clip based on the clip content feature corresponding to the clip; determining a viewing popularity of each viewing angle of interest based on the actual viewing angle of the user corresponding to the clip; and obtaining the candidate viewing angle set corresponding to the clip by using each viewing angle of interest of which the viewing popularity is greater than or equal to a preset popularity threshold as a candidate viewing angle.

Specifically, for each clip, analysis may be performed on a clip content feature of the clip at different viewing angles to determine all viewing angles of interest to the user for the clip. For example, when the clip content is a soccer ball being kicked into the goal, a viewing angle that does not obscure the soccer ball may be determined as a viewing angle of interest. Statistical analysis is performed on the actual viewing angle of the user corresponding to the clip, to determine the number of users when the viewing angle of interest is used as the actual viewing angle of the user, that is, a viewing popularity of the viewing angle of interest, and each viewing angle of interest having a viewing popularity greater than or equal to a preset popularity threshold is used as a candidate viewing angle, to obtain a candidate viewing angle set corresponding to the clip. Therefore, the candidate viewing angle set corresponding to each clip can be more accurately determined using both the clip content feature and the actual viewing angle of the user, further improving the accuracy of viewing angle prediction.

Figure 3:
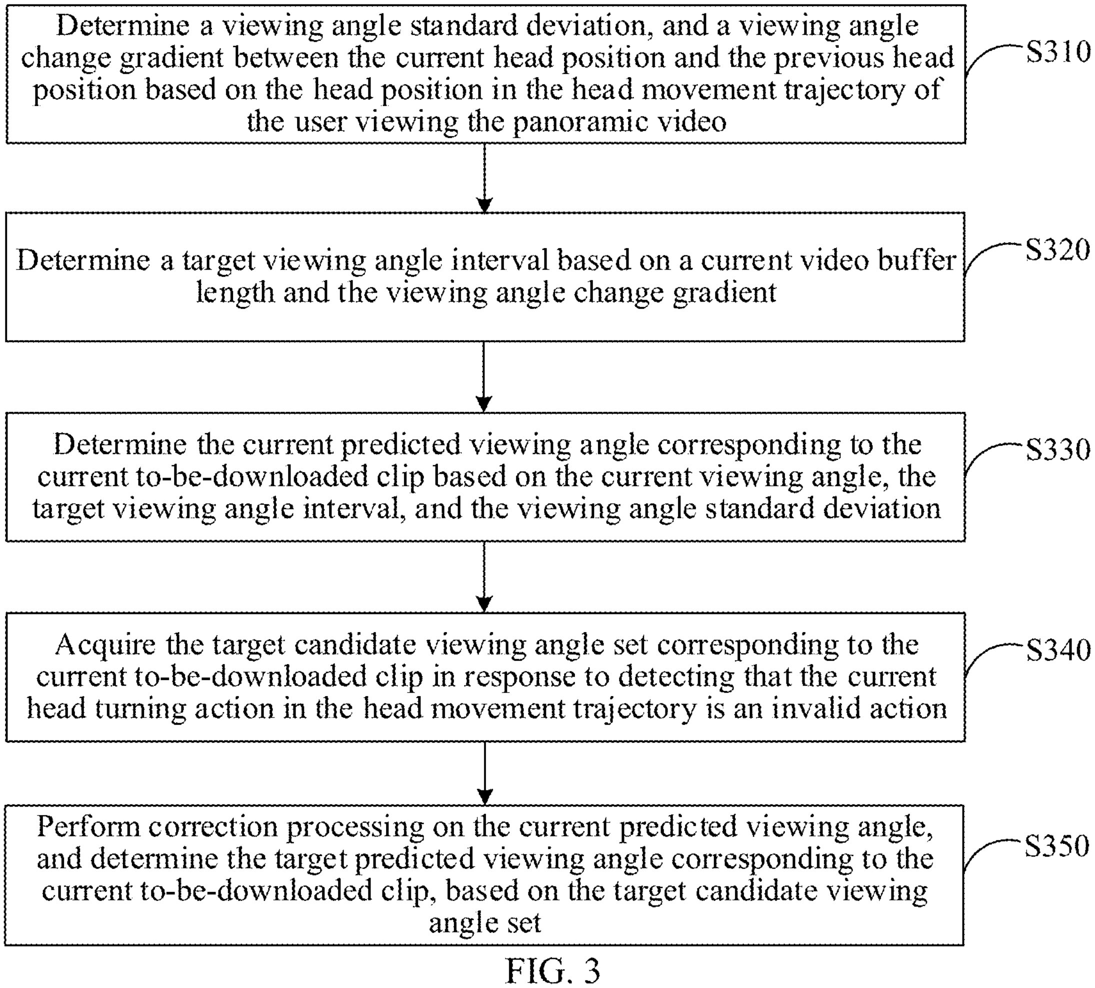
FIG. 3 is a schematic flowchart of another viewing angle prediction method according to an embodiment of the disclosure.

FIG. 3 is a schematic flowchart of another viewing angle prediction method according to an embodiment of the disclosure. On the basis of the embodiments disclosed above, this embodiment of the disclosure further optimizes the step of "determining a current predicted viewing angle corresponding to a current to-be-downloaded clip in a panoramic video based on a head movement trajectory of a user viewing the panoramic video". Explanations of the terms identical or corresponding to those in the embodiments disclosed above are not repeated herein.

As shown in FIG. 3, the viewing angle prediction method specifically includes the following steps.

S310: Determine a viewing angle standard deviation, and a viewing angle change gradient between the current head position and the previous head position based on the head position in the head movement trajectory of the user viewing the panoramic video.

The viewing angle standard deviation may be used to represent the viewing angle change of the user during viewing the panoramic video. A larger viewing angle standard deviation indicates that the user prefers to change their viewing angle. The viewing angle change gradient may refer to the rate of the viewing angle change of the current head turning action. The head position corresponds to the viewing angle. For example, each head position may correspond to one viewing angle, or a head position change range within a range may correspond to one viewing angle.

Specifically, the viewing angle corresponding to each head position in the head movement trajectory of the user viewing the panoramic video may be obtained, and standard deviation calculation may be performed on all viewing angles during the process of the user viewing the panoramic video, to obtain the viewing angle standard deviation. The viewing angle change gradient of the current head turning action of the user is determined based on the current viewing angle corresponding to the current head position, a previous viewing angle corresponding to the previous head position, and a time interval between the current head position and the previous head position.

S320: Determine a target viewing angle interval based on a current video buffer length and the viewing angle change gradient.

The current video buffer length may refer to a duration of the video currently buffered by the playback device. The target viewing angle interval may be used to represent the degree of the viewing angle deviation between the current moment and a future playback moment of the current to-be-downloaded clip.

Specifically, the current video buffer length and the viewing angle change gradient may be multiplied, and an obtained multiplication result is determined as the target viewing angle interval.

S330: Determine the current predicted viewing angle corresponding to the current to-be-downloaded clip based on the current viewing angle, the target viewing angle interval, and the viewing angle standard deviation.

Specifically, whether the degree of the viewing angle deviation between the current moment and the future playback moment of the current to-be-downloaded clip is overlarge may be detected based on the target viewing angle interval and the viewing angle standard deviation, and the current viewing angle may be processed based on a detection result, to obtain the current predicted viewing angle corresponding to the current to-be-downloaded clip, thereby avoiding a large deviation in the viewing angle prediction result due to the large current video buffer length, further ensuring the accuracy of viewing angle prediction, and further improving the subsequent viewing angle correction effect.

For example, S330 may include: determining a viewing angle interval threshold based on the viewing angle standard deviation; determining the current predicted viewing angle corresponding to the current to-be-downloaded clip based on the current viewing angle and the viewing angle interval threshold when the target viewing angle interval is greater than the viewing angle interval threshold; and determining the current predicted viewing angle corresponding to the current to-be-downloaded clip based on the current viewing angle and the target viewing angle interval when the target viewing angle interval is less than or equal to the viewing angle interval threshold.

Specifically, twice the viewing angle standard deviation may be determined as the viewing angle interval threshold based on the properties of Gaussian distribution, so as to ensure that most prediction cases can be covered. When the target viewing angle interval is less than or equal to the viewing angle interval threshold, the current viewing angle and the target viewing angle interval are added, and an obtained addition result is determined as the current predicted viewing angle corresponding to the current to-be-downloaded clip. When the target viewing angle interval is greater than the viewing angle interval threshold, the current viewing angle and the viewing angle interval threshold are added, and an obtained addition result is determined as the current predicted viewing angle corresponding to the current to-be-downloaded clip, thereby limiting the prediction result, and avoiding the overlarge deviation.

S340: Acquire the target candidate viewing angle set corresponding to the current to-be-downloaded clip in response to detecting that the current head turning action in the head movement trajectory is an invalid action.

S350: Perform correction processing on the current predicted viewing angle, and determine the target predicted viewing angle corresponding to the current to-be-downloaded clip, based on the target candidate viewing angle set.

In the technical solutions of this embodiment of the disclosure, the target viewing angle interval is determined based on the current video buffer length and the viewing angle change gradient between the current head position and the previous head position, and the current predicted viewing angle corresponding to the current to-be-downloaded clip is determined based on the current viewing angle, the target viewing angle interval, and the viewing angle standard deviation, thereby avoiding a large deviation in the viewing angle prediction result due to the large current video buffer length, further ensuring the accuracy of current predicted viewing angle, and further improving the subsequent viewing angle correction effect.

Figure 4:
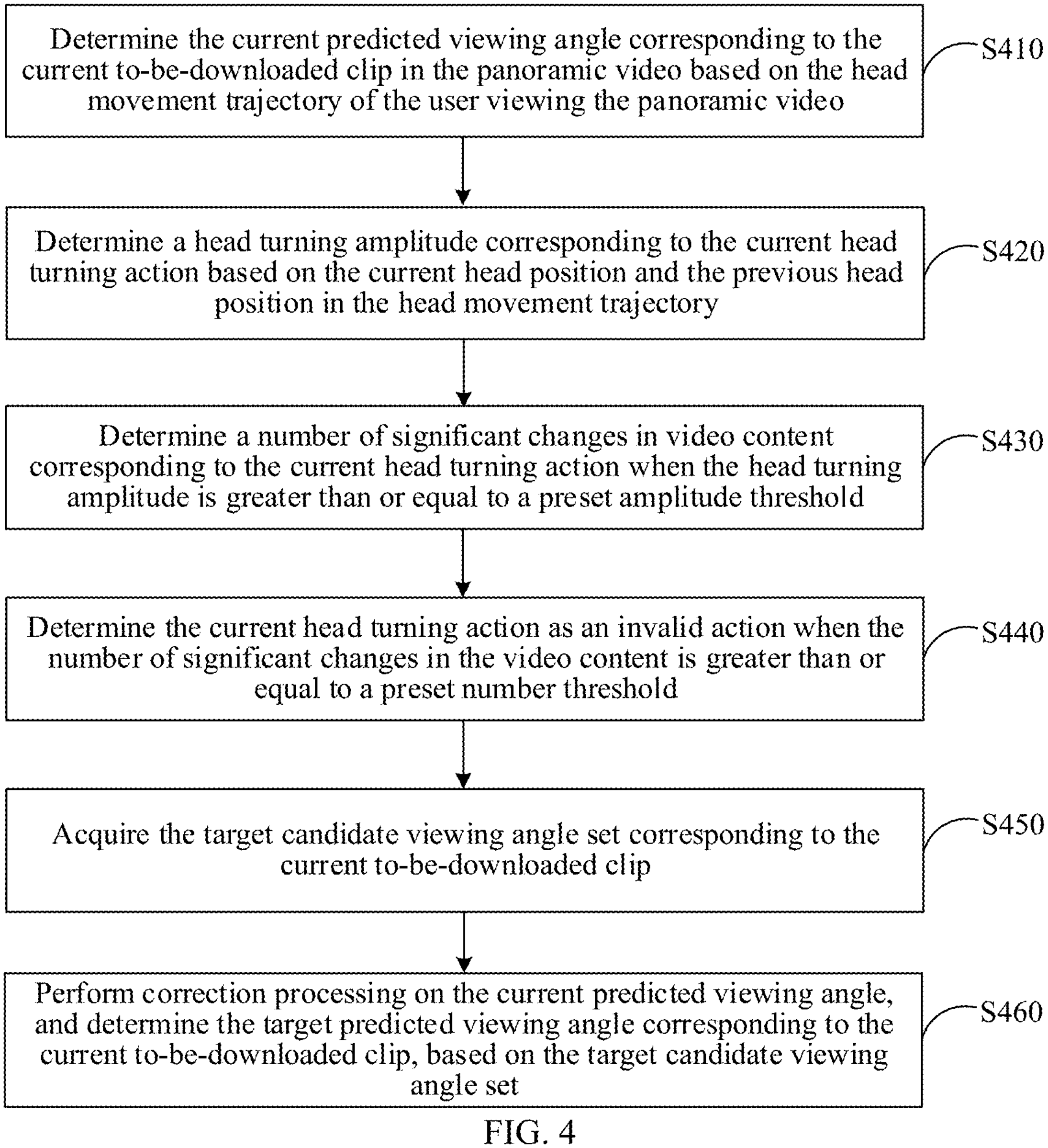
FIG. 4 is a schematic flowchart of yet another viewing angle prediction method according to an embodiment of the disclosure.

FIG. 4 is a schematic flowchart of yet another viewing angle prediction method according to an embodiment of the disclosure. On the basis of the embodiments disclosed above, this embodiment of the disclosure describes in detail a manner for detecting whether the current head turning action is an invalid action. Explanations of the terms identical or corresponding to those in the embodiments disclosed above are not repeated herein.

As shown in FIG. 4, the viewing angle prediction method specifically includes the following steps.

S410: Determine the current predicted viewing angle corresponding to the current to-be-downloaded clip in the panoramic video based on the head movement trajectory of the user viewing the panoramic video.

S420: Determine a head turning amplitude corresponding to the current head turning action based on the current head position and the previous head position in the head movement trajectory.

Specifically, the current head position of the user may be subtracted from the previous head position to obtain the head turning amplitude corresponding to the current head turning action.

S430: Determine a number of significant changes in video content corresponding to the current head turning action when the head turning amplitude is greater than or equal to a preset amplitude threshold.

The preset amplitude threshold may refer to a minimum head turning amplitude required for viewing angle correction. Specifically, when the head turning amplitude corresponding to the current head turning action of the user is greater than or equal to the preset amplitude threshold, it indicates that the head turning amplitude of the user is overlarge, and the head movement trajectory changes drastically. In this case, the degree of change in the video content during the current head turning action may be identified, to determine the number of significant changes in the video content.

It should be noted that when the head turning amplitude is less than the preset amplitude threshold, it indicates that the head turning amplitude of the current head turning action is small, and the current predicted viewing angle predicted based on the head movement trajectory has been corrected to some extent. In this case, the current head turning action may be determined as a valid action, and it may be no longer necessary to perform correction processing using the candidate viewing angle set, thereby further ensuring the viewing angle correction effect.

For example, "determining a number of significant changes in video content corresponding to the current head turning action" in S430 may include: acquiring all target video frames corresponding to the current head turning action in the panoramic video; determining an image structural similarity between every two adjacent target video frames; and determining a number of image structural similarities that are greater than or equal to a preset similarity threshold as the number of significant changes in the video content.

The image structural similarity is used to measure a similarity between two pieces of image content. The target video frame refers to a video frame viewed during the current head turning action. Different target video frames correspond to different viewing angles.

Specifically, all video frames that the user views during the current head turning may be used as the target video frames. An image structural similarity between every two adjacent target video frames is determined based on video content of every two adjacent target video frames, and whether there is a significant change between the video content of every two adjacent target video frames is determined based on the image structural similarity. For example, when the image structural similarity between two adjacent target video frames is greater than or equal to the preset similarity threshold, the number of significant changes in the video content is increased by 1, so that the number of the image structural similarities that are greater than or equal to the preset similarity threshold may be determined as the number of significant changes in the video content.

S440: Determine the current head turning action as an invalid action when the number of significant changes in the video content is greater than or equal to a preset number threshold.

The preset number threshold may refer to a minimum value of the number of significant changes in the video content that requires viewing angle correction. Specifically, when the number of significant changes in the video content is greater than or equal to the preset number threshold, the current head turning action may be determined as an invalid action of accidental head turning due to non-video factors. When the number of significant changes in the video content is less than the preset number threshold, the current head turning action may be determined as a valid action, and it may be no longer necessary to perform correction processing using the candidate viewing angle set, thereby further ensuring the viewing angle correction effect.

S450: Acquire the target candidate viewing angle set corresponding to the current to-be-downloaded clip.

S460: Perform correction processing on the current predicted viewing angle, and determine the target predicted viewing angle corresponding to the current to-be-downloaded clip, based on the target candidate viewing angle set.

In the technical solutions of this embodiment of the disclosure, the head turning amplitude corresponding to the current head turning action is determined based on the current head position and the previous head position in the head movement trajectory. When the head turning amplitude is greater than or equal to the preset amplitude threshold, the number of significant changes in the video content corresponding to the current head turning action is determined. When the number of significant changes in the video content is greater than or equal to the preset number threshold, the current head turning action may be determined as an invalid action of accidental head turning due to non-video factors, thereby further ensuring the viewing angle correction effect.

Figure 5:
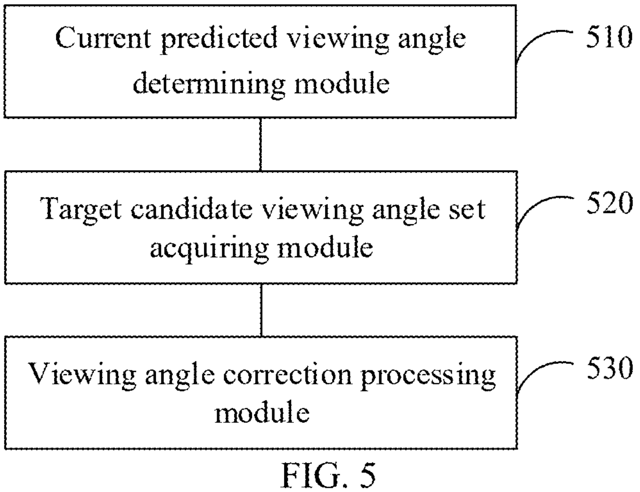
FIG. 5 is a schematic diagram of a structure of a viewing angle prediction apparatus according to an embodiment of the disclosure.

FIG. 5 is a schematic diagram of a structure of a viewing angle prediction apparatus according to an embodiment of the disclosure. As shown in FIG. 5, the apparatus specifically includes: a current predicted viewing angle determining module 510, a target candidate viewing angle set acquiring module 520, and a viewing angle correction processing module 530.

The current predicted viewing angle determining module 510 is configured to determine a current predicted viewing angle corresponding to a current to-be-downloaded clip in a panoramic video based on a head movement trajectory of a user viewing the panoramic video. The target candidate viewing angle set acquiring module 520 is configured to acquire a target candidate viewing angle set corresponding to the current to-be-downloaded clip in response to detecting that a current head turning action in the head movement trajectory is an invalid action. The viewing angle correction processing module 530 is configured to perform correction processing on the current predicted viewing angle, and determine a target predicted viewing angle corresponding to the current to-be-downloaded clip, based on the target candidate viewing angle set.

In the technical solutions provided in this embodiment of the disclosure, the current predicted viewing angle corresponding to the current to-be-downloaded clip in the panoramic video is determined based on the head movement trajectory of the user viewing the panoramic video, and whether the current head turning action in the head movement trajectory is an invalid action is detected. When the current head turning action is an invalid action, it indicates that the user is currently turning the head with a large amplitude due to non-video factors. In this case, correction processing may be performed on the current predicted viewing angle based on the target candidate viewing angle set corresponding to the current to-be-downloaded clip, so that a more accurate target predicted viewing angle corresponding to the current to-be-downloaded clip can be obtained, thereby avoiding a large deviation in the predicted viewing angle caused by an overlarge head turning amplitude of the user due to non-video factors, and improving the accuracy of viewing angle prediction.

On the basis of the above technical solutions, the current predicted viewing angle determining module 510 includes:

- a viewing angle change gradient determining unit configured to determine a viewing angle standard deviation, and a viewing angle change gradient between a current head position and a previous head position based on a head position in the head movement trajectory of the user viewing the panoramic video, wherein the head position corresponds to a viewing angle;
- a target viewing angle interval determining unit configured to determine a target viewing angle interval based on a current video buffer length and the viewing angle change gradient; and
- a current predicted viewing angle determining unit configured to determine the current predicted viewing angle corresponding to the current to-be-downloaded clip based on a current viewing angle, the target viewing angle interval, and the viewing angle standard deviation.

On the basis of the above technical solutions, the current predicted viewing angle determining unit is specifically configured to:

- determine a viewing angle interval threshold based on the viewing angle standard deviation; determine the current predicted viewing angle corresponding to the current to-be-downloaded clip based on the current viewing angle and the viewing angle interval threshold when the target viewing angle interval is greater than the viewing angle interval threshold; and determine the current predicted viewing angle corresponding to the current to-be-downloaded clip based on the current viewing angle and the target viewing angle interval when the target viewing angle interval is less than or equal to the viewing angle interval threshold.

On the basis of the above technical solutions, the apparatus further includes: a head turning action detection module, including:

- a head turning amplitude determining unit configured to determine a head turning amplitude corresponding to the current head turning action based on a current head position and a previous head position in the head movement trajectory;
- a change number determining unit configured to determine a number of significant changes in video content corresponding to the current head turning action when the head turning amplitude is greater than or equal to a preset amplitude threshold; and
- an invalid action determining unit configured to determine the current head turning action as an invalid action when the number of significant changes in the video content is greater than or equal to a preset number threshold.

On the basis of the above technical solutions, the change number determining unit is specifically configured to:

- acquire all target video frames corresponding to the current head turning action in the panoramic video; determine an image structural similarity between every two adjacent target video frames; and determine a number of image structural similarities that are greater than or equal to a preset similarity threshold as the number of significant changes in the video content.

On the basis of the above technical solutions, the target candidate viewing angle set acquiring module 520 is specifically configured to:

- acquire a panoramic video header file corresponding to the panoramic video, wherein the panoramic video header file includes a candidate viewing angle set corresponding to each clip of the panoramic video, the candidate viewing angle set is determined based on a clip content feature corresponding to each clip, and/or an actual viewing angle of the user; and obtain the target candidate viewing angle set corresponding to the current to-be-downloaded clip based on the panoramic video header file.

On the basis of the above technical solutions, the apparatus further includes:

- a candidate viewing angle set determining module configured to determine, for each clip, all viewing angles of interest corresponding to the clip based on the clip content feature corresponding to the clip; determine a viewing popularity of each viewing angle of interest based on the actual viewing angle of the user corresponding to the clip; and obtain the candidate viewing angle set corresponding to the clip by using each viewing angle of interest of which the viewing popularity is greater than or equal to a preset popularity threshold as a candidate viewing angle.

On the basis of the above technical solutions, the viewing angle correction processing module 530 is specifically configured to:

- determine a viewing angle difference between each target candidate viewing angle in the target candidate viewing angle set and the current predicted viewing angle; and determine a target candidate viewing angle with a minimum viewing angle difference as the target predicted viewing angle corresponding to the current to-be-downloaded clip.

The viewing angle prediction apparatus provided in this embodiment of the disclosure can perform the viewing angle prediction method provided in any embodiment of the disclosure, and has corresponding functional modules and beneficial effects for performing the viewing angle prediction method.

It is worth noting that the units and modules included in the above apparatus are obtained through division merely according to functional logic, but are not limited to the above division, as long as corresponding functions can be implemented. In addition, specific names of the functional units are merely used for mutual distinguishing, and are not used to limit the protection scope of the embodiments of the disclosure.

Figure 6:
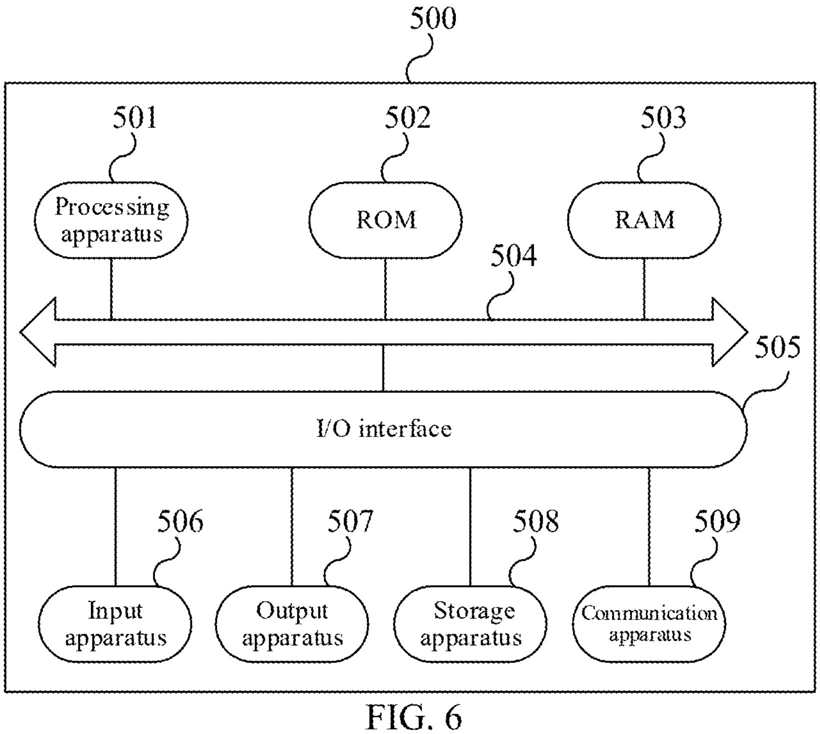
FIG. 6 is a schematic diagram of a structure of an electronic device according to an embodiment of the disclosure.

FIG. 6 is a schematic diagram of a structure of an electronic device according to an embodiment of the disclosure. Reference is made to FIG. 6 below, which is a schematic diagram of a structure of an electronic device (such as a terminal device or a server in FIG. 6) 500 suitable for implementing an embodiment of the disclosure. The terminal device in this embodiment of the disclosure may include, but is not limited to, a mobile terminal such as a mobile phone, a notebook computer, a digital broadcast receiver, a personal digital assistant (PDA), a tablet computer (PAD), a portable multimedia player (PMP), a vehicle-mounted terminal (such as a vehicle navigation terminal), etc., and a fixed terminal such as a digital TV, a desktop computer, etc. The electronic device shown in FIG. 6 is merely an example, and shall not impose any limitation on the function and scope of use of the embodiments of the disclosure.

As shown in FIG. 6, the electronic device 500 may include a processing apparatus (e.g., a central processing unit, a graphics processing unit, etc.) 501 that may perform a variety of appropriate actions and processing in accordance with a program stored in a read-only memory (ROM) 502 or a program loaded from a storage apparatus 508 into a random access memory (RAM) 503. The RAM 503 further stores various programs and data required for the operation of the electronic device 500. The processing apparatus 501, the ROM 502, and the RAM 503 are connected to each other through a bus 504. An input/output (I/O) interface 505 is also connected to the bus 504.

Generally, the following apparatuses may be connected to the I/O interface 505: an input apparatus 506 including, for example, a touchscreen, a touchpad, a keyboard, a mouse, a camera, a microphone, an accelerometer, a gyroscope, etc.; an output apparatus 507 including, for example, a liquid crystal display (LCD), a speaker, a vibrator, etc.; the storage apparatus 508 including, for example, a tape, a hard disk, etc.; and a communication apparatus 509. The communication apparatus 509 may allow the electronic device 500 to perform wireless or wired communication with other devices to exchange data. Although FIG. 6 shows the electronic device 500 having various apparatuses, it should be understood that it is not required to implement or have all of the shown apparatuses. It may be an alternative to implement or have more or fewer apparatuses.

In particular, according to an embodiment of the disclosure, the process described above with reference to the flowchart may be implemented as a computer software program. For example, this embodiment of the disclosure includes a computer program product, which includes a computer program carried on a non-transitory computer-readable medium, the computer program includes program code for performing the method shown in the flowchart. In such an embodiment, the computer program may be downloaded and installed from a network through the communication apparatus 509, installed from the storage apparatus 508, or installed from the ROM 502. When the computer program is executed by the processing apparatus 501, the above-mentioned functions defined in the method of the embodiment of the disclosure are performed.

The names of messages or information exchanged between a plurality of apparatuses in the implementations of the disclosure are used for illustrative purposes only, and are not used to limit the scope of these messages or information.

The electronic device provided in this embodiment of the disclosure and the viewing angle prediction method provided in the above embodiments belong to the same concept of disclosure. For the technical details not described in detail in this embodiment, reference may be made to the above embodiments, and this embodiment and the above embodiments have the same beneficial effects.

This embodiment of the disclosure provides a computer storage medium having stored thereon a computer program that, when executed by a processor, causes the viewing angle prediction method provided in the above embodiments to be implemented.

It should be noted that the above computer-readable medium described in the disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electric connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the disclosure, the computer-readable storage medium may be any tangible medium containing or storing a program which may be used by or in combination with an instruction execution system, apparatus, or device. In the disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, the client and the server may communicate using any currently known or future-developed network protocol such as a Hypertext Transfer Protocol (HTTP), and may be connected to digital data communication (for example, communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to:

The above computer-readable medium carries one or more programs that, when executed by the electronic device, cause the electronic device to: determine a current predicted viewing angle corresponding to a current to-be-downloaded clip in a panoramic video based on a head movement trajectory of a user viewing the panoramic video; acquire a target candidate viewing angle set corresponding to the current to-be-downloaded clip in response to detecting that a current head turning action in the head movement trajectory is an invalid action; and perform correction processing on the current predicted viewing angle, and determine a target predicted viewing angle corresponding to the current to-be-downloaded clip, based on the target candidate viewing angle set.

Computer program code for performing operations of the disclosure can be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and block diagram in the accompanying drawings illustrate the possibly implemented architecture, functions, and operations of the system, method, and computer program product according to various embodiments of the disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the disclosure may be implemented by software, or may be implemented by hardware. Names of the units do not constitute a limitation on the units themselves in some cases, for example, a first obtaining unit may alternatively be described as "a unit for obtaining at least two Internet Protocol addresses".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disc read-only memory (CD-ROM), an optical storage device, a magnetic storage device, or any suitable combination thereof.

According to one or more embodiments of the disclosure, Example 1 provides a viewing angle prediction method. The method includes:

- determining a current predicted viewing angle corresponding to a current to-be-downloaded clip in a panoramic video based on a head movement trajectory of a user viewing the panoramic video;
- acquiring a target candidate viewing angle set corresponding to the current to-be-downloaded clip in response to detecting that a current head turning action in the head movement trajectory is an invalid action; and
- performing correction processing on the current predicted viewing angle, and determining a target predicted viewing angle corresponding to the current to-be-downloaded clip, based on the target candidate viewing angle set.

According to one or more embodiments of the disclosure, Example 2 provides a viewing angle prediction method. The method further includes the following:

Optionally, determining a current predicted viewing angle corresponding to the current to-be-downloaded clip in the panoramic video based on the head movement trajectory of the user viewing the panoramic video includes:

- determining a viewing angle standard deviation, and a viewing angle change gradient between a current head position and a previous head position based on a head position in the head movement trajectory of the user viewing the panoramic video, wherein the head position corresponds to a viewing angle;
- determining a target viewing angle interval based on a current video buffer length and the viewing angle change gradient; and
- determining the current predicted viewing angle corresponding to the current to-be-downloaded clip based on a current viewing angle, the target viewing angle interval, and the viewing angle standard deviation.

According to one or more embodiments of the disclosure, Example 3 provides a viewing angle prediction method. The method further includes the following:

Optionally, determining the current predicted viewing angle corresponding to the current to-be-downloaded clip based on the current viewing angle, the target viewing angle interval, and the viewing angle standard deviation includes:

determining a viewing angle interval threshold based on the viewing angle standard deviation;

determining the current predicted viewing angle corresponding to the current to-be-downloaded clip based on the current viewing angle and the viewing angle interval threshold when the target viewing angle interval is greater than the viewing angle interval threshold; and determining the current predicted viewing angle corresponding to the current to-be-downloaded clip based on the current viewing angle and the target viewing angle interval when the target viewing angle interval is less than or equal to the viewing angle interval threshold.

According to one or more embodiments of the disclosure, Example 4 provides a viewing angle prediction method. The method further includes the following:

Optionally, it is detected that the current head turning action in the head movement trajectory is an invalid action includes:

determining a head turning amplitude corresponding to the current head turning action based on a current head position and a previous head position in the head movement trajectory;

determining a number of significant changes in video content corresponding to the current head turning action when the head turning amplitude is greater than or equal to a preset amplitude threshold; and determining the current head turning action as an invalid action when the number of significant changes in the video content is greater than or equal to a preset number threshold.

According to one or more embodiments of the disclosure, Example 5 provides a viewing angle prediction method. The method further includes the following:

Optionally, determining the number of significant changes in video content corresponding to the current head turning action includes:

acquiring all target video frames corresponding to the current head turning action in the panoramic video;

determining an image structural similarity between every two adjacent target video frames; and determining a number of the image structural similarities greater than or equal to a preset similarity threshold as the number of significant changes in the video content.

According to one or more embodiments of the disclosure, Example 6 provides a viewing angle prediction method. The method further includes the following:

Optionally, acquiring the target candidate viewing angle set corresponding to the current to-be-downloaded clip includes:

acquiring a panoramic video header file corresponding to the panoramic video, wherein the panoramic video header file includes: a candidate viewing angle set corresponding to each clip of the panoramic video, the candidate viewing angle set is determined based on a clip content feature corresponding to each clip, and/or an actual viewing angle of the user; and obtaining the target candidate viewing angle set corresponding to the current to-be-downloaded clip based on the panoramic video header file.

According to one or more embodiments of the disclosure, Example 7 provides a viewing angle prediction method. The method further includes the following:

Optionally, determining the candidate viewing angle set based on the clip content feature corresponding to each clip, and an actual viewing angle of the user includes:

determining, for each clip, all viewing angles of interest corresponding to the clip based on the clip content feature corresponding to the clip;

determining a viewing popularity of each viewing angle of interest based on the actual viewing angle of the user corresponding to the clip; and obtaining the candidate viewing angle set corresponding to the clip by using each viewing angle of interest of which the viewing popularity is greater than or equal to a preset popularity threshold as a candidate viewing angle.

According to one or more embodiments of the disclosure, Example 8 provides a viewing angle prediction method. The method further includes the following:

Optionally, performing correction processing on the current predicted viewing angle, and determining the target predicted viewing angle corresponding to the current to-be-downloaded clip, based on the target candidate viewing angle set includes:

determining a viewing angle difference between each target candidate viewing angle in the target candidate viewing angle set and the current predicted viewing angle; and determining a target candidate viewing angle with a minimum viewing angle difference as the target predicted viewing angle corresponding to the current to-be-downloaded clip.

According to one or more embodiments of the disclosure, Example 9 provides a viewing angle prediction apparatus. The apparatus includes:

a current predicted viewing angle determining module configured to determine a current predicted viewing angle corresponding to a current to-be-downloaded clip in a panoramic video based on a head movement trajectory of a user viewing the panoramic video;

a target candidate viewing angle set acquiring module configured to acquire a target candidate viewing angle set corresponding to the current to-be-downloaded clip in response to detecting that a current head turning action in the head movement trajectory is an invalid action; and a viewing angle correction processing module configured to perform correction processing on the current predicted viewing angle, and determine a target predicted viewing angle corresponding to the current to-be-downloaded clip, based on the target candidate viewing angle set.

The foregoing descriptions are merely preferred embodiments of the disclosure and explanations of the applied technical principles. Those skilled in the art should understand that the scope of disclosure involved in the disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the disclosure (but not limited thereto) also falls within the scope of the disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A viewing angle prediction method, comprising:

determining a current predicted viewing angle corresponding to a current to-be-downloaded clip in a panoramic video based on a head movement trajectory of a user viewing the panoramic video;

acquiring a target candidate viewing angle set corresponding to the current to-be-downloaded clip in response to detecting that a current head turning action in the head movement trajectory is an invalid action; and performing correction processing on the current predicted viewing angle and determining a target predicted viewing angle corresponding to the current to-be-downloaded clip based on the target candidate viewing angle set, wherein acquiring the target candidate viewing angle set corresponding to the current to-be-downloaded clip comprises:

acquiring a panoramic video header file corresponding to the panoramic video, wherein the panoramic video header file comprises a candidate viewing angle set corresponding to each clip of the panoramic video, the candidate viewing angle set is determined based on a clip content feature corresponding to each clip, and/or an actual viewing angle of the user; and obtaining the target candidate viewing angle set corresponding to the current to-be-downloaded clip based on the panoramic video header file.

2. The viewing angle prediction method according to claim 1, wherein determining the current predicted viewing angle corresponding to the current to-be-downloaded clip in the panoramic video based on the head movement trajectory of the user viewing the panoramic video comprises:

determining a viewing angle standard deviation, and a viewing angle change gradient between a current head position and a previous head position based on a head position in the head movement trajectory of the user viewing the panoramic video, wherein the head position corresponds to a viewing angle;

determining a target viewing angle interval based on a current video buffer length and the viewing angle change gradient; and determining the current predicted viewing angle corresponding to the current to-be-downloaded clip based on a current viewing angle, the target viewing angle interval, and the viewing angle standard deviation.

3. The viewing angle prediction method according to claim 2, wherein determining the current predicted viewing angle corresponding to the current to-be-downloaded clip based on the current viewing angle, the target viewing angle interval, and the viewing angle standard deviation comprises:

determining a viewing angle interval threshold based on the viewing angle standard deviation;

determining the current predicted viewing angle corresponding to the current to-be-downloaded clip based on the current viewing angle and the viewing angle interval threshold when the target viewing angle interval is greater than the viewing angle interval threshold; and determining the current predicted viewing angle corresponding to the current to-be-downloaded clip based on the current viewing angle and the target viewing angle interval when the target viewing angle interval is less than or equal to the viewing angle interval threshold.

4. The viewing angle prediction method according to claim 1, wherein detecting that the current head turning action in the head movement trajectory is an invalid action comprises:

determining a head turning amplitude corresponding to the current head turning action based on a current head position and a previous head position in the head movement trajectory;

determining a number of significant changes in video content corresponding to the current head turning action when the head turning amplitude is greater than or equal to a preset amplitude threshold; and determining the current head turning action as an invalid action when the number of significant changes in the video content is greater than or equal to a preset number threshold.

5. The viewing angle prediction method according to claim 4, wherein determining the number of significant changes in video content corresponding to the current head turning action comprises:

acquiring all target video frames corresponding to the current head turning action in the panoramic video;

determining an image structural similarity between every two adjacent target video frames; and determining a number of image structural similarities that are greater than or equal to a preset similarity threshold as the number of significant changes in the video content.

6. The viewing angle prediction method according to claim 1, wherein determining the candidate viewing angle set based on a clip content feature corresponding to each clip, and an actual viewing angle of the user comprises:

determining, for each clip, all viewing angles of interest corresponding to each clip based on the clip content feature corresponding to each clip;

determining a viewing popularity of each viewing angle of interest based on the actual viewing angle of the user corresponding to each clip; and obtaining the candidate viewing angle set corresponding to each clip by using each viewing angle of interest of which the viewing popularity is greater than or equal to a preset popularity threshold as a candidate viewing angle.

7. The viewing angle prediction method according to claim 1, wherein performing correction processing on the current predicted viewing angle, and determining a target predicted viewing angle corresponding to the current to-be-downloaded clip, based on the target candidate viewing angle set comprises:

determining a viewing angle difference between each target candidate viewing angle in the target candidate viewing angle set and the current predicted viewing angle; and determining a target candidate viewing angle with a minimum viewing angle difference as the target predicted viewing angle corresponding to the current to-be-downloaded clip.

8. An electronic device, comprising:

one or more processors; and a storage apparatus configured to store one or more programs, wherein the one or more programs, when executed by the one or more processors, cause the one or more processors to:

determine a current predicted viewing angle corresponding to a current to-be-downloaded clip in a panoramic video based on a head movement trajectory of a user viewing the panoramic video;

acquire a target candidate viewing angle set corresponding to the current to-be-downloaded clip in response to detecting that a current head turning action in the head movement trajectory is an invalid action; and perform correction processing on the current predicted viewing angle and determining a target predicted viewing angle corresponding to the current to-be-downloaded clip based on the target candidate viewing angle set, wherein acquire the target candidate viewing angle set corresponding to the current to-be-downloaded clip comprises:

acquire a panoramic video header file corresponding to the panoramic video, wherein the panoramic video header file comprises a candidate viewing angle set corresponding to each clip of the panoramic video, the candidate viewing angle set is determined based on a clip content feature corresponding to each clip, and/or an actual viewing angle of the user; and obtain the target candidate viewing angle set corresponding to the current to-be-downloaded clip based on the panoramic video header file.

9. The electronic device according to claim 8, wherein the one or more processors are further caused to:

determine a viewing angle standard deviation, and a viewing angle change gradient between a current head position and a previous head position based on a head position in the head movement trajectory of the user viewing the panoramic video, wherein the head position corresponds to a viewing angle;

determine a target viewing angle interval based on a current video buffer length and the viewing angle change gradient; and determine the current predicted viewing angle corresponding to the current to-be-downloaded clip based on a current viewing angle, the target viewing angle interval, and the viewing angle standard deviation.

10. The electronic device according to claim 9, wherein the one or more processors are further caused to:

determine a viewing angle interval threshold based on the viewing angle standard deviation;

determine the current predicted viewing angle corresponding to the current to-be-downloaded clip based on the current viewing angle and the viewing angle interval threshold when the target viewing angle interval is greater than the viewing angle interval threshold; and determine the current predicted viewing angle corresponding to the current to-be-downloaded clip based on the current viewing angle and the target viewing angle interval when the target viewing angle interval is less than or equal to the viewing angle interval threshold.

11. The electronic device according to claim 8, wherein the one or more processors are further caused to:

determine a head turning amplitude corresponding to the current head turning action based on a current head position and a previous head position in the head movement trajectory;

determine a number of significant changes in video content corresponding to the current head turning action when the head turning amplitude is greater than or equal to a preset amplitude threshold; and determine the current head turning action as an invalid action when the number of significant changes in the video content is greater than or equal to a preset number threshold.

12. The electronic device according to claim 11, wherein the one or more processors are further caused to:

acquire all target video frames corresponding to the current head turning action in the panoramic video;

determine an image structural similarity between every two adjacent target video frames; and determine a number of image structural similarities that are greater than or equal to a preset similarity threshold as the number of significant changes in the video content.

13. The electronic device according to claim 8, wherein the one or more processors are further caused to:

determine, for each clip, all viewing angles of interest corresponding to each clip based on the clip content feature corresponding to each clip;

determine a viewing popularity of each viewing angle of interest based on the actual viewing angle of the user corresponding to each clip; and obtain the candidate viewing angle set corresponding to each clip by using each viewing angle of interest of which the viewing popularity is greater than or equal to a preset popularity threshold as a candidate viewing angle.

14. The electronic device according to claim 8, wherein the one or more processors are further caused to:

determine a viewing angle difference between each target candidate viewing angle in the target candidate viewing angle set and the current predicted viewing angle; and determine a target candidate viewing angle with a minimum viewing angle difference as the target predicted viewing angle corresponding to the current to-be-downloaded clip.

15. A non-transitory storage medium, with computer-executable instructions stored thereon, wherein the computer-executable instructions, when executed by a computer processor, cause the computer processor to:

determine a current predicted viewing angle corresponding to a current to-be-downloaded clip in a panoramic video based on a head movement trajectory of a user viewing the panoramic video;

acquire a target candidate viewing angle set corresponding to the current to-be-downloaded clip in response to detecting that a current head turning action in the head movement trajectory is an invalid action; and perform correction processing on the current predicted viewing angle and determining a target predicted viewing angle corresponding to the current to-be-downloaded clip based on the target candidate viewing angle set, wherein acquire the target candidate viewing angle set corresponding to the current to-be-downloaded clip comprises:

acquire a panoramic video header file corresponding to the panoramic video, wherein the panoramic video header file comprises a candidate viewing angle set corresponding to each clip of the panoramic video, the candidate viewing angle set is determined based on a clip content feature corresponding to each clip, and/or an actual viewing angle of the user; and obtain the target candidate viewing angle set corresponding to the current to-be-downloaded clip based on the panoramic video header file.

16. The non-transitory storage medium according to claim 15, wherein the computer processor is further caused to:

determine a viewing angle standard deviation, and a viewing angle change gradient between a current head position and a previous head position based on a head position in the head movement trajectory of the user viewing the panoramic video, wherein the head position corresponds to a viewing angle;

determine a target viewing angle interval based on a current video buffer length and the viewing angle change gradient; and determine the current predicted viewing angle corresponding to the current to-be-downloaded clip based on a current viewing angle, the target viewing angle interval, and the viewing angle standard deviation.

17. The non-transitory storage medium according to claim 15, wherein the computer processor is further caused to:

determine a head turning amplitude corresponding to the current head turning action based on a current head position and a previous head position in the head movement trajectory;

determine a number of significant changes in video content corresponding to the current head turning action when the head turning amplitude is greater than or equal to a preset amplitude threshold; and determine the current head turning action as an invalid action when the number of significant changes in the video content is greater than or equal to a preset number threshold.

* * * * *